(12) United States Patent
Nogata (10) Patent No.: US 9,616,607 B2
(45) Date of Patent: Apr. 11, 2017

(54) PROCESS FOR PRODUCING MICROPOROUS POLYOLEFIN FILM

(71) Applicant: Tetsuro Nogata, Kawasaki (JP)

(72) Inventor: Tetsuro Nogata, Kawasaki (JP)

( * ) Notice: Subject to any disclaimer, the term of this patent is extended or adjusted under 35 U.S.C. 154(b) by 371 days.

(21) Appl. No.: 14/369,941

(22) PCT Filed: Jan. 7, 2013

(86) PCT No.: PCT/JP2013/050027
§ 371 (c)(1),
(2) Date: Jun. 30, 2014

(87) PCT Pub. No.: WO2013/105526
PCT Pub. Date: Jul. 18, 2013

(65) Prior Publication Data
US 2014/0361457 A1    Dec. 11, 2014

(30) Foreign Application Priority Data

Jan. 10, 2012  (JP) ................................. 2012-002298

(51) Int. Cl.
*B29C 47/00*    (2006.01)
*B01D 71/26*    (2006.01)
(Continued)

(52) U.S. Cl.
CPC ........ *B29C 47/0057* (2013.01); *B01D 67/003* (2013.01); *B01D 67/0027* (2013.01);
(Continued)

(58) Field of Classification Search
CPC ............ B29C 47/0057; B29C 47/0047; B29C 47/0059; B29C 47/0061; B29C 47/8805; B29C 47/8845; B29C 55/12; B29C 71/009; B29C 67/224; B01D 67/0027; B01D 67/003; B01D 71/26; B02D 67/003; H01M 2/145; H01M 2/1653; H01M 2/18

See application file for complete search history.

(56) References Cited

U.S. PATENT DOCUMENTS

2014/0077405 A1    3/2014    Funaoka

FOREIGN PATENT DOCUMENTS

| JP | 2002-060532 A | 2/2002 |
| JP | 2006-249208 A | 9/2006 |
| JP | 2008-088393 A | 4/2008 |

*Primary Examiner* — Stella Yi
(74) *Attorney, Agent, or Firm* — Bruzga & Associates; Charles E. Bruzga; Jay S. Pattumudi (57) ABSTRACT

In a method for manufacturing a polyolefin microporous film, non-uniformity in a film resulting from non-uniform drying during solvent extraction is minimized, high-speed drying and high-speed continuous productivity of the polyolefin microporous film are implemented. In the method for manufacturing a polyolefin microporous film, in which a composition composed of a polyolefin resin and a plasticizer is made into a film form using extrusion, the plasticizer is extracted and removed using a solvent, and the film is thereafter dried. After the foregoing extraction and before the drying, the film is brought into close contact with a roll, or its width is mechanically restrained. A liquid (heating medium) having a temperature greater than or equal to the boiling point of the solvent is made to contact the film while the film is in close contact with the roll or while the width is restrained, whereby the film is heated and dried.

6 Claims, 7 Drawing Sheets

(51) Int. Cl.
  *H01M 2/16*      (2006.01)
  *B01D 67/00*     (2006.01)
  *B29C 47/88*     (2006.01)
  *B29C 55/12*     (2006.01)
  *B29C 71/00*     (2006.01)
  *H01M 2/14*      (2006.01)
  *H01M 2/18*      (2006.01)
  *H01M 10/0525*       (2010.01)
  *B29K 23/00*         (2006.01)
  *B29K 105/00*        (2006.01)
  *B29K 105/04*        (2006.01)
  *B29L 31/34*         (2006.01)
  *B29L 31/00*         (2006.01)

(52) U.S. Cl.
  CPC .......... *B01D 71/26* (2013.01); *B29C 47/0021* (2013.01); *B29C 47/8805* (2013.01); *B29C 55/12* (2013.01); *B29C 71/0009* (2013.01); *H01M 2/145* (2013.01); *H01M 2/1653* (2013.01); *H01M 2/18* (2013.01); *B01D 2323/20* (2013.01); *B29C 47/8845* (2013.01); *B29C 2071/0027* (2013.01); *B29K 2023/065* (2013.01); *B29K 2105/0038* (2013.01); *B29K 2105/041* (2013.01); *B29L 2031/3468* (2013.01); *B29L 2031/755* (2013.01); *H01M 10/0525* (2013.01)

PROCESS FOR PRODUCING MICROPOROUS POLYOLEFIN FILM

FIELD OF THE INVENTION

The field relates to a method for manufacturing a polyolefin microporous film that is ideally used as, e.g., a filter membrane or a separator for various batteries and capacitors. More specifically, the field relates to a method for manufacturing a polyolefin microporous film in which high-speed solvent drying is implemented, enabling high-speed continuous productivity and allowing superior quality and uniformity to be obtained.

BACKGROUND OF THE INVENTION

Conventionally, microporous films have been used as separators or other materials used in cells and electrolytic capacitors. Demand for applications in lithium-ion secondary cells in particular has been increasing in recent years, and there exists a great need for high-speed production of separators.

Electrolytic fluids, positive and negative electrode active materials, and other agents are used in lithium-ion secondary cells. Therefore, a polyolefin-based polymer, particularly polyethylene or polypropylene, which is inexpensive, is typically used as the material for the separator, taking chemical resistance into account. Characteristics such as electrode short-circuit prevention, high ion permeability, ease of assembly and processing during winding of the cell, cell safety, and reliability have conventionally been desired as basic functions of separators applied in lithium-ion secondary cells and other cells employing a non-aqueous electrolyte. Uniform quality has also been greatly needed in recent years as the size, energy density, and output of cells have increased.

Well-known methods for manufacturing polyolefin microporous films involve melt-kneading a composition composed of a polyolefin resin and a plasticizer; extruding the composition from a die and molding the composition into a film form; after extrusion, stretching the film uniaxially or biaxially; after stretching, using a solvent to extract the plasticizer from the film; drying the solvent; and, as necessary after drying, further stretching or heat-treating (Japanese Laid-Open Patent Application No 5-156058, Japanese Laid-Open Patent Application No. 11-60789, Japanese Laid-Open Patent Application 2010-235707).

A well-known method for drying of the solvent after extraction of the plasticizer involves drying on drying rolls such that the width of the film is mechanically restrained, and the speed of the drying rolls is 35 to 50 m/min (Japanese Laid-Open Patent Application 2011-42805).

PRIOR ART

Patent Documents

Patent Document 1 refers to; Japanese Laid-Open Patent Application No. 5-156058.
Patent Document 2 refers to: Japanese Laid-Open Patent Application No. 11-60789.
Patent Document 3 refers to Japanese Laid-Open Patent Application 2010-235707.
Patent Document 4 refers to Japanese Laid-Open Patent Application 2011-4280.

SUMMARY OF THE INVENTION

In one example of a method for manufacturing a polyolefin microporous olefin film, the method comprises: (a) a step for melt-kneading a composition containing at least a polyolefin film and a plasticizer, extruding the kneaded composition from a die, and molding the extrudate into a film form; (b) a step for stretching the obtained film in at least one direction after the extruding and molding; (c) a step for extraction by using a solvent to extract and thereby remove the plasticizer from the film after the stretching; and (d) a step for drying the film after the extraction, the method for manufacturing a polyolefin microporous film being characterized in that the film is brought into close contact with a roll set to a temperature lower than a boiling point of the solvent after the extraction step and before the drying step; and a liquid lacking an affinity for polyolefin and being of a temperature equal to or greater than the boiling point of the solvent is brought into contact with the film while the film remains in close contact with the roll, whereby the film is heated and dried.

In another example of a method for manufacturing a polyolefin microporous film, the method comprises: (a) a step for melt-kneading a composition containing at least a polyolefin film and a plasticizer, extruding the kneaded composition from a die, and molding the extrudate into a film form; (b) a step for stretching the obtained film in at least one direction after the extruding and molding; (c) a step for extraction by using a solvent to extract and thereby remove the plasticizer from the film after the stretching; and (d) a step for drying the film after the extraction, the method for manufacturing a polyolefin microporous film being characterized in that a width of the film is mechanically restrained after the extraction step and before the drying step; and a liquid lacking an affinity for polyolefin and being of a temperature equal to or greater than a boiling point of the solvent is brought into contact with the film while the mechanical restraint of the width of the film is maintained, whereby the film is heated and dried.

BRIEF DESCRIPTION OF THE DRAWINGS

Further features and advantages of the invention will become apparent from reading the following detailed description in conjunction with the following drawings, in which like reference numbers refer to like parts.

DETAILED DESCRIPTION

The examples and drawings provided in the detailed description are merely examples, and should not be used to limit the scope of the claims in any claim construction or interpretation.

Problems to be Solved by the Invention

In the prior art, trouble was rarely encountered in the step for drying the solvent after extracting the solvent in the period when the film-production speed was slow. Therefore, various methods using hot air, contact with heating rolls, immersion in a heating medium, and the like have been proposed (Patent Document 1) as ideal drying methods; however, specifically, methods for blowing hot air on heating rolls, where the heating devices can be readily constructed, came to be widely employed.

However, when the film-production speed increases, the film path lengthens from the start to the end of drying, and the absolute lengths of dried and undried portions in the drying step both increase. Slight irregularities in the thickness of the film cause thin portions to be dried in a shorter time, while thick portions require more time to dry. Additionally, the dried portions contract, while the un-dried portions remain long, and therefore the undried portions detach from the heating rolls, and the time for drying the undried portions further increases.

When microporous films are in a half-dried state, the negative pressure resulting from the Laplace force causes pores to be crushed, and the porosity therefore decreases when the drying time is long. Non-uniform drying therefore negatively impacts the uniformity of porosity and thickness.

On the other hand, when the temperature of the heating rolls is made to be significantly higher than the boiling point of the solvent in order to contract the drying time with the object of shortening the film path from the start to the end of drying, the solvent rapidly vaporizes on the surface of the heating rolls, the film comes off the heating roils, and the heating efficiency decreases. Increasing the temperature of the heating rolls and thereby reducing the drying time has therefore also been problematic.

Means Used to Solve the Above-Mentioned Problems

As a result of thorough investigations into the aforementioned problems, instead of drying using heating rolls or hot air, the present inventors brought a liquid heating medium into contact with the film while maintaining the film in a state of adhesion to a low-temperature roll or maintaining a state of mechanical restraint on the width of the film, whereby the film is heated and dried, whereby a solution for the aforementioned problems was discovered, and the inventors arrived at the present invention.

Specifically, a first aspect of the present invention is a method for manufacturing a polyolefin microporous film, comprising (a) a step for melt-kneading a composition, extruding the kneaded composition from a die, and molding the extrudate into a film form, the composition containing at least a polyolefin resin and a plasticizer; (b) a step for stretching the obtained film in at least one direction after the extruding and molding; (c) a step for using a solvent to extract and thereby remove the plasticizer from the film after the stretching; and (d) a step for drying the film after the extraction, the method for manufacturing a polyolefin microporous film being characterized in that the film is brought into close contact with a roll kept at a temperature lower than a boiling point of the solvent after the extraction step and before the drying step; and a liquid lacking an affinity for polyolefin and being of a temperature equal to or greater than the boiling point of the solvent is brought into contact with the film while the film remains in close contact with the roll, whereby the film is heated and dried.

A second aspect of the present invention is a method for manufacturing a polyolefin microporous film, comprising (a) a step for melt-kneading a composition, extruding the kneaded composition from a die, and molding the extrudate into a film form, the composition containing at least a polyolefin resin and a plasticizer; (b) a step for stretching the obtained film in at least one direction after the extruding and molding; (c) a step for using a solvent to extract and thereby remove the plasticizer from the film after the stretching; and (d) a step for drying the film after the extraction, the method for manufacturing a polyolefin microporous film being characterized in that a width of the film is mechanically restrained after the extraction step and before the drying step; and a liquid lacking an affinity for polyolefin and being of a temperature equal to or greater than a boiling point of the solvent is brought into contact with the film while the mechanical restraint of the width of the film is maintained, whereby the film is heated and dried.

In one example of the present invention, after the extraction step and before the drying step, the film is brought into close contact with a low-temperature roll, or the width of the film is mechanically restrained, and drying is performed while maintaining that state, whereby the film can be prevented from contracting in the widthwise direction due to the drying.

In cases where the film is brought into close contact with a roll, the temperature of the roll must be lower than the boiling point of the solvent. When the temperature of the roll is greater than or equal to the boiling point of the solvent, the solvent rapidly vaporizes, and the film is not able to be brought into close contact with the roll, which is therefore undesirable.

A clip-type tenter device is preferable as means for mechanically restraining the width of the film. Any method for mechanically restraining both edge parts while the film is in close contact with the roll may be used.

In one example of the present invention, a liquid lacking affinity with polyolefins is used as a heating medium, and the heating medium is brought into contact with the film at a temperature greater than or equal to the boiling point of the solvent, whereby the film is heated, and the solvent is evaporated, removed, and dried. The film is heated directly using a high-temperature liquid, whereby adequate heat can be imparted to the film in a short time, and the drying time can be contracted. Since a liquid heating medium is used for the heating, even if, hypothetically, undried portions detach from the roll, the heating efficiency does not decrease, and high-speed drying can be implemented. A liquid lacking affinity with polyolefins is selected as the heating medium, whereby the heating medium does not enter into the film, and even if, hypothetically, a small amount of the heating medium does enter the film, negative pressures resulting from the Laplace force will be generated due to the lack of affinity with the polyolefin, and the pores will not be crushed.

The liquid that lacks affinity with the polyolefin and is used as the heating medium is preferably water, because water has a large specific heat.

Examples of the method for bringing the heating medium into contact with the film include methods for passing the film through the heating medium and methods for spraying the heating medium onto the film. In cases where the heating medium is sprayed on the film, in order to limit the solvent vaporizing on the roll surface and the film coming off from the conveying roll, the liquid heating medium is brought into contact with the film from the side of the film opposite from the roll.

Effect of the Invention

According to the method for manufacturing a polyolefin microporous film of the present invention, high-speed continuous productivity is enabled, decreases in porosity resulting from contraction of the film can be prevented, and the uniformity of porosity and film pressure can be improved. Lax alignment of the polyolefin during drying is also minimized, and decreases in strength can be prevented.

BEST MODE FOR CARRYING OUT THE INVENTION

Embodiments of the present invention will be described in detail below. Homopolymers or copolymers of ethylene, propylene, 1-butene, 4-methyl-1-pentene, 1-hexene, 1-octene, or other olefins can be used as the polyolefin used in the present invention. Among these, high-density polyethylene is preferable in being inexpensive and in reaching a high degree of crystallization as a result of significant stretching.

In cases where high-density polyethylene is used, the weight-average molecular weight (measured using gel permeation chromatography) is preferably 10,000 or more, and more preferably 50,000 or more. When the molecular weight is too small, the melt tension during melt forming may be low, the moldability may be poor, the stretchability may be poor, and strength may be poor, which is not preferable. There is no particular upper limit for the weight-average molecular weight as long as the weight is a range that allows melt forming and a uniform resin composition, but 1,000,000 or less is normal, and 700,000 or less is preferable.

The plasticizer used in the method is a non-volatile solvent that when mixed together with the polyolefin resin allows a uniform solution to be formed at or above the melting temperature of the polyolefin resin. Specific examples include liquid paraffin, paraffin wax, and other hydrocarbons; dioctyl phthalate, dibutyl phthalate, and other esters; and oleyl alcohol, stearyl alcohol, and other higher alcohols. Among these, liquid paraffin and paraffin wax are particularly preferable in being readily obtained and easily handled.

Any ratio of the polyolefin resin and the plasticizer used in the present invention is acceptable as long as the ratio is sufficient for microphase separation to occur and for a microporous film to be formed after extraction and removal of the plasticizer. Specifically, the polyolefin resin content is 10 to 70 wt %, and particularly preferably 20 to 50 wt %.

Melt-kneading of the polyolefin resin and the plasticizer is preferably performed by normal methods using a multi-screw extruder, a single-screw extruder, or the like.

Depending on the purpose, antioxidants, crystal-nucleating agents, antistatic agents, flame retardants, lubricants, UV-absorbing agents, and other additives may be added to the composition composed of the polyolefin resin and the plasticizer.

The melt-kneaded resin composition is molded into the form of a sheet or film (both referred to as "film form" below) using extrusion. Extrusion may involve extruding a film form using a T-die (flat die) or using a circular die or the like to extrude a tubular shape, which is then worked into a film form. The thickness of the film after extrusion is preferably 1 to 500 μm, and particularly preferably 5 to 100 μm. Strength readily becomes insufficient when the film is too thin, and, when used as a cell separator or the like, the occupied volume of the separator may become too large when the film is too thick.

The extruded film is stretched along at least one axial direction. "Stretching in at least one axial direction" means uniaxial stretching in the machine direction, uniaxial stretching in the width direction, simultaneous biaxial stretching, or sequential biaxial stretching. Stretching is not limited to a single stage but may involve multi-stage or repeated stretching. The stretching method is not particularly limited but may involve roll stretching or stretching using a tenter. Biaxial stretching is particularly preferable in order to implement high strength.

The stretching temperature may be any temperature used in routine methods. Stretching is performed [at a temperature] in a range, e.g., less than or equal to the melting temperature (Tm) of the polyolefin resin composition and greater than or equal to (Tm−50)° C.

The draw ratio is not particularly limited. In the case of uniaxial stretching, the draw ratio is preferably a factor 2 to 20 and particularly preferably 4 to 10. In the case of biaxial stretching, the area magnification is usually a factor of 2 to 400, and particularly preferably 4 to 200.

After stretching, the plasticizer is extracted and removed from the film. The plasticizer is extracted by continuously feeding the microporous film into a tank filled with an extraction solvent, immersing the film for a time adequate for the removal of the plasticizer, and then drying any adhering solvent. The extraction efficiency is increased when using well-known means such as multistage methods, in which the inside of the tank is divided into multiple stages, and the microporous film is sequentially fed into tanks having different concentrations, and counter-flow methods for supplying extraction solvent in the opposite direction from that in which the microporous film proceeds, and creating a concentration gradient. These methods are preferable. Substantially removing the plasticizer from the microporous film is essential. Diffusion between the plasticizer and the solvent can be facilitated when the temperature of the extraction solvent is raised within a range below the boiling point of the solvent, and the extraction efficiency can therefore be increased, which is more preferable.

The extraction solvent used in the present invention should be a poor solvent for the polyolefin and a favorable solvent for the plasticizer, and should have a boiling point lower than the melting point of the polyolefin resin. The boiling point of the solvent is more preferably below 100° C. Specific examples of such a solvent for cases in which the plasticizer is liquid paraffin or paraffin wax include n-hexane, cyclohexane, and other hydrocarbons; methylene chloride, 1,1,1-trichloromethane, and other halogenated hydrocarbons; ethanol, isopropanol, and other alcohols; tetrahydrofuran, ethyl ether, and other ethers; and acetone, methylethyl ketone, and other ketones. Among these, methylene chloride or cyclohexane is particularly preferable in being easy to obtain and handle.

After extraction of the plasticizer and before the drying step, the film is brought into close contact with a cooling roll, or the width of the film is mechanically restrained.

In the case of bringing it into dose contact with a cooling roll, the surface temperature of the cooling roll should be less than or equal to the boiling point of the solvent and such that the solvent does not significantly condense. Specifically, in cases where the solvent is methylene chloride, 0 to 40'C. is preferable, and near 35° C., is more preferable.

In the case of mechanically restraining the width of the film, the method of mechanical restraint preferably involves a tenter device for using a plurality of clips to grip both edge parts of the film and to cause the clips to move along with the motion of the film. A method for using a belt-shaped object to hold both edge parts of the film when the film is in close contact with a roll can also be used to mechanically restrain the width of the film.

After bringing the film into close contact with a cooling roll or mechanically restraining the width of the film, the film is brought into contact with a liquid heating medium and thereby heated, and the solvent dried, while maintaining the adhesion to the cooling roll or the restraint of the film width. The liquid used as the heating medium must not have an affinity for the polyolefin. Since the liquid used as the heating medium does not have an affinity for the polyolefin, the heating-medium liquid does not enter into the polyolefin microporous film. Specifically, the liquid used as the heating medium is preferably water.

The boiling point of the heating-medium liquid is greater than or equal to the boiling point of the extraction solvent.

The method for bringing the heating-medium liquid into contact with the film may involve immersing the film in the heating medium, passing the film through a tank filled with the heating-medium liquid, spraying the heating medium onto the film, or the like.

In cases of spraying, the film is preferably sprayed from the side of the surface opposite the side of the conveying roll. When the heating medium is sprayed from the roll side, solvent on the roll surface may rapidly vaporize, and the film may detach from the roll.

EXAMPLES

Examples of embodiments of the present invention will be described in further detail below, but the present invention is not limited by these examples.

Example 1

30 parts by weight of a polyolefin resin material (resulting from dry-blending 0.3 parts by weight of 2,6-di-t-butyl-p-cresol into 100 parts by weight of high-density polyethylene (weight-average molecular weight: 300,000; ratio of weight-average molecular weight to number-average molecular weight: 7; density: 0.956)) and 70 parts by weight of liquid paraffin (kinematic viscosity: 75.9 cSt at 37.78° C.) were melt-kneaded using a biaxial extruder. The resin mix was extruded from a flat die (coat-hanger die) onto a cooling roll controlled to have a surface temperature of 40° C., and a sheet-form microporous film precursor having a width of 1.1 mm was obtained.

The resulting sheet-form microporous film precursor was next stretched 5×5 times at 119° C. using a tenter-type simultaneous biaxial stretching machine, and a film-shaped microporous-film precursor having a uniform width of 1000 mm and a uniform thickness of the 40 μm was obtained.

The resulting film-shaped microporous-film precursor was brought into contact with methylene chloride (solvent) via counter-flow for approximately two hours, and the liquid paraffin (plasticizer) was extracted and removed.

Figure 1:
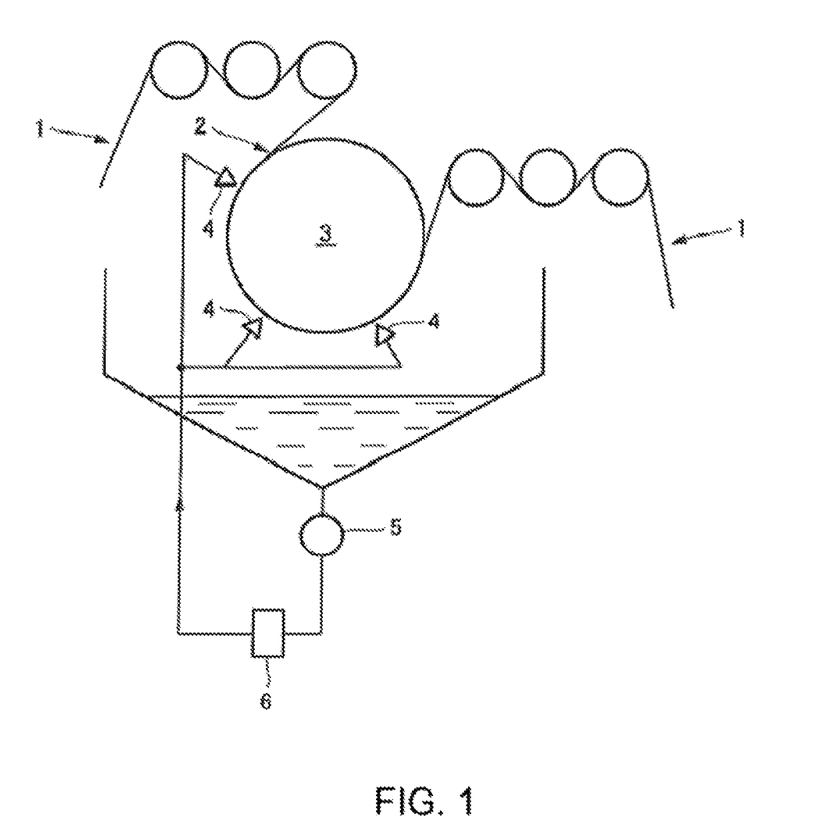
FIG. 1 is a schematic diagram of a drying device used in Example 1 of the present invention.

After extraction and removal of the liquid paraffin, the film was heated and dried at a film-production speed of 70 m/min using the drying device of FIG. 1. Specifically, a polyethylene microporous film 1 from which liquid paraffin was extracted and removed was brought into close contact with a cooling roll 3, which was controlled to have a temperature of 35° C. at a point 2. Hot water at a temperature of 65° C. was sprayed nozzles 4 while adhesion was maintained, and the methylene chloride was heated and removed.

Figure 3:
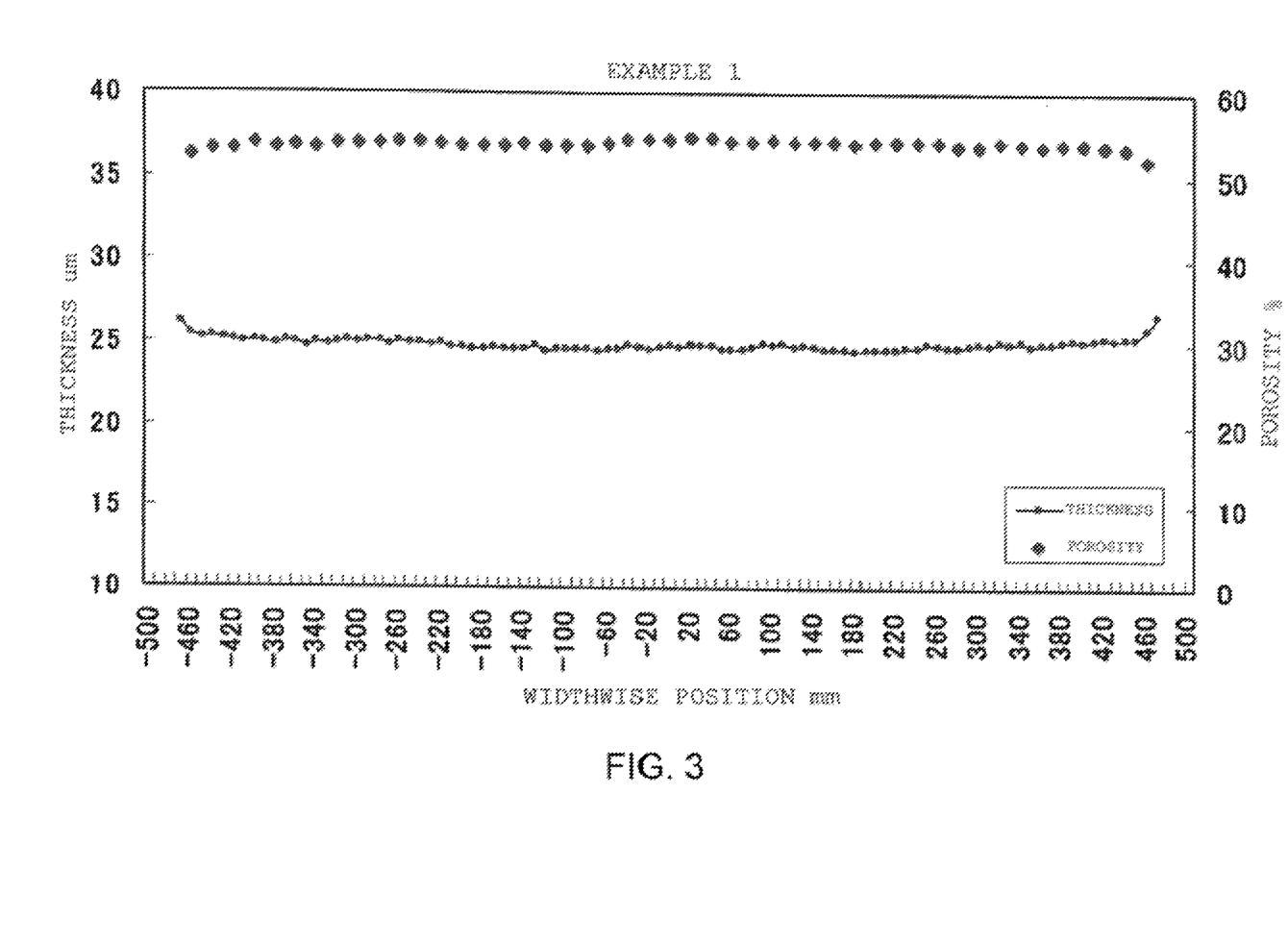
FIG. 3 is a graph of the distribution of thickness and porosity of the microporous film obtained in Example 1 of the present invention.

The results of using the following method to measure the widthwise distribution of the thickness and porosity of the dried microporous film are shown in Table 1 and FIG. 3.

[Thickness Measurement]

A Litematic VL-50A-B (contact point number: 120060) made by Mitutoyo was used to measure the thickness at a pitch of 10 mm in the widthwise direction using the widthwise center of the microporous film as a reference.

[Porosity Measurement]

Every 20 mm in the widthwise direction, a 20×20 mm sample was cut out, and the weight of the microporous film was measured using the widthwise center of the microporous film as a reference. Porosity was then calculated from the weight of the 20×20 mm sample and the average thickness obtained from three points corresponding thereto (the arithmetical mean resulting from imparting double weight to a thickness Tc in the center) according to the following equation.

$$\text{Porosity (\%)} = \{1 - (\text{weight(g)} \div \text{density(g/cm3)}) / \\ (\text{thickness(cm)} \times 2(\text{cm}) \times 2(\text{cm}))\} \times 100 = \\ 100 - \text{weight(μg)} \div \{\text{thickness(μm)} \times 4\} \div \text{density} = \\ 100 - \text{weight} \div [\{(2 \times TC + T1 + T2) \div 4\} \times 4] \div 0.995$$

[Formula 1]

The equation above was calculated using the density (0.995 g/cm3) of polyethylene having a degree of crystallization of 85 to 90%.

Example 2

Figure 2:
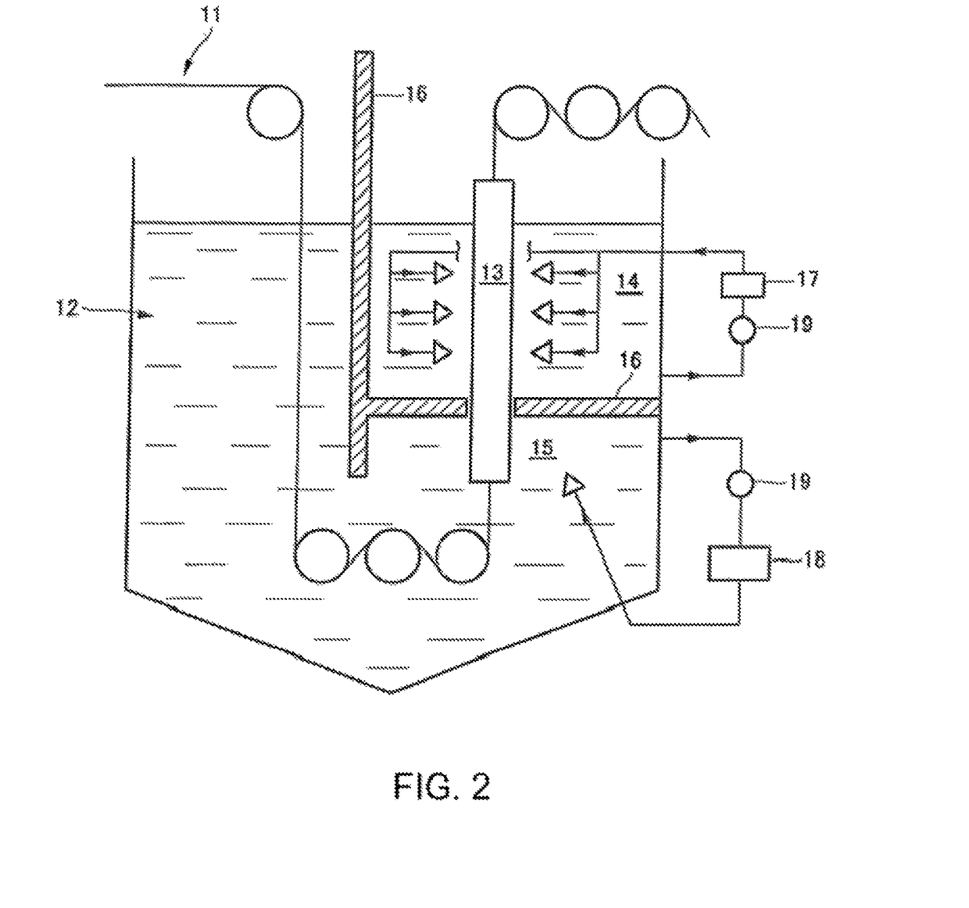
FIG. 2 is a schematic diagram of a drying device used in Example 2 of the present invention.
Figure 4:
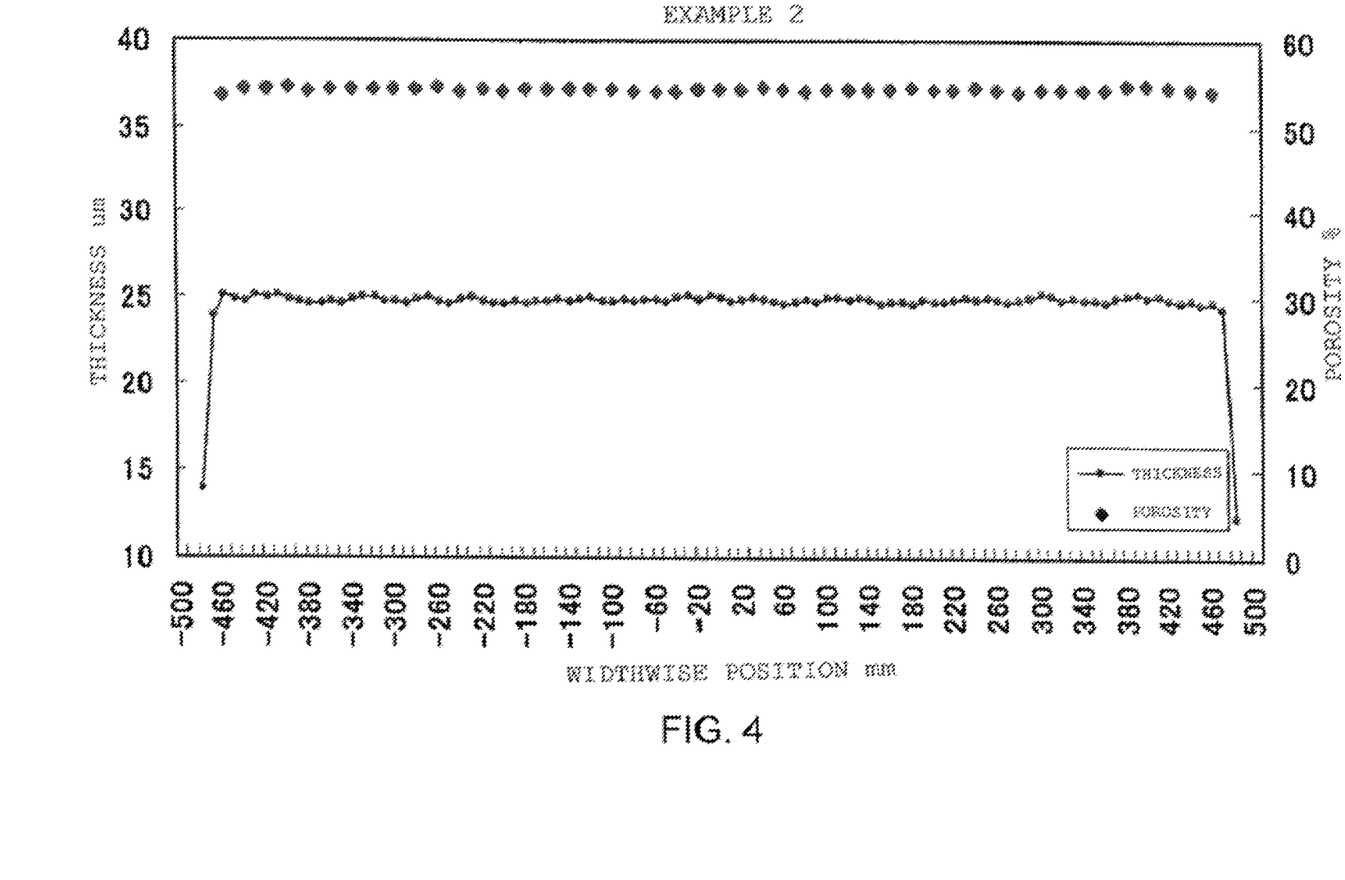
FIG. 4 is a graph of the distribution of thickness and porosity of the microporous film obtained in Example 2 of the present invention.

Other than drying using the device of FIG. 2 at a film-production speed of 120 m/min, [Example 2 was made] in the same manner as Example 1. Specifically, a polyethylene microporous film 11 was passed through water 12 and heated using hot water 14 at a temperature of approximately 60° C. while using a tenter 13 to restrain the film in the widthwise direction. Water 15 at a position where restraint using the tenter in the widthwise direction began was controlled to be approximately 25° C. The widthwise distribution of the thickness and porosity of the microporous film thus obtained are shown in Table 1 and FIG. 4.

Comparative Example 1

Figure 5:
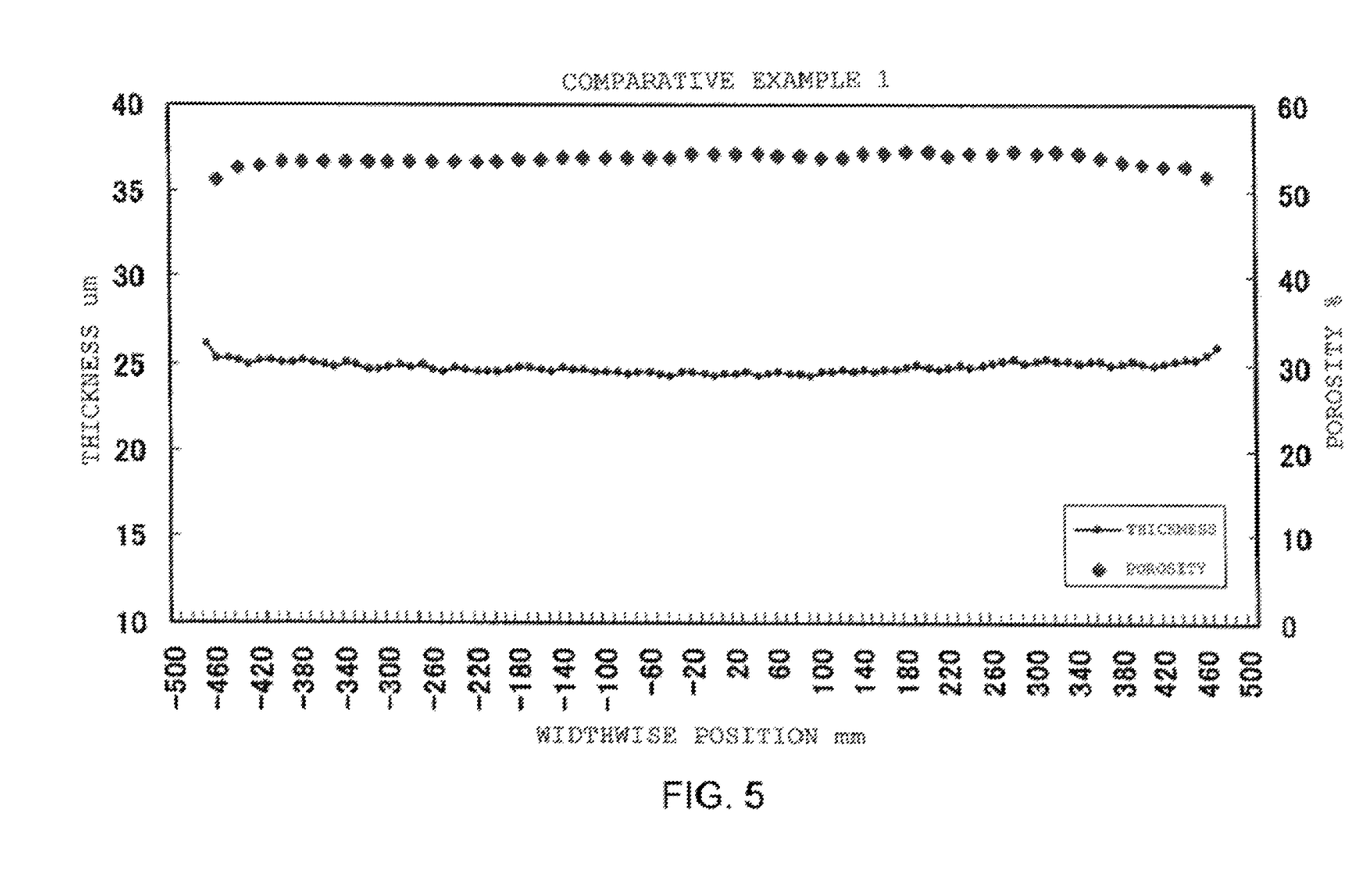
FIG. 5 is a graph of the distribution of thickness and porosity of the microporous film obtained in Comparative Example 1 of the present invention.

Other than a drying process in which 50° C. hot air was blown on a 40° C. heating roll at a film-production speed of 10 m/min, [Comparative Example 1 was made] in the same manner as Example 1. The widthwise distribution of the thickness and porosity of the resulting microporous film are shown in Table 1 and FIG. 5.

Comparative Example 2

Figure 6:
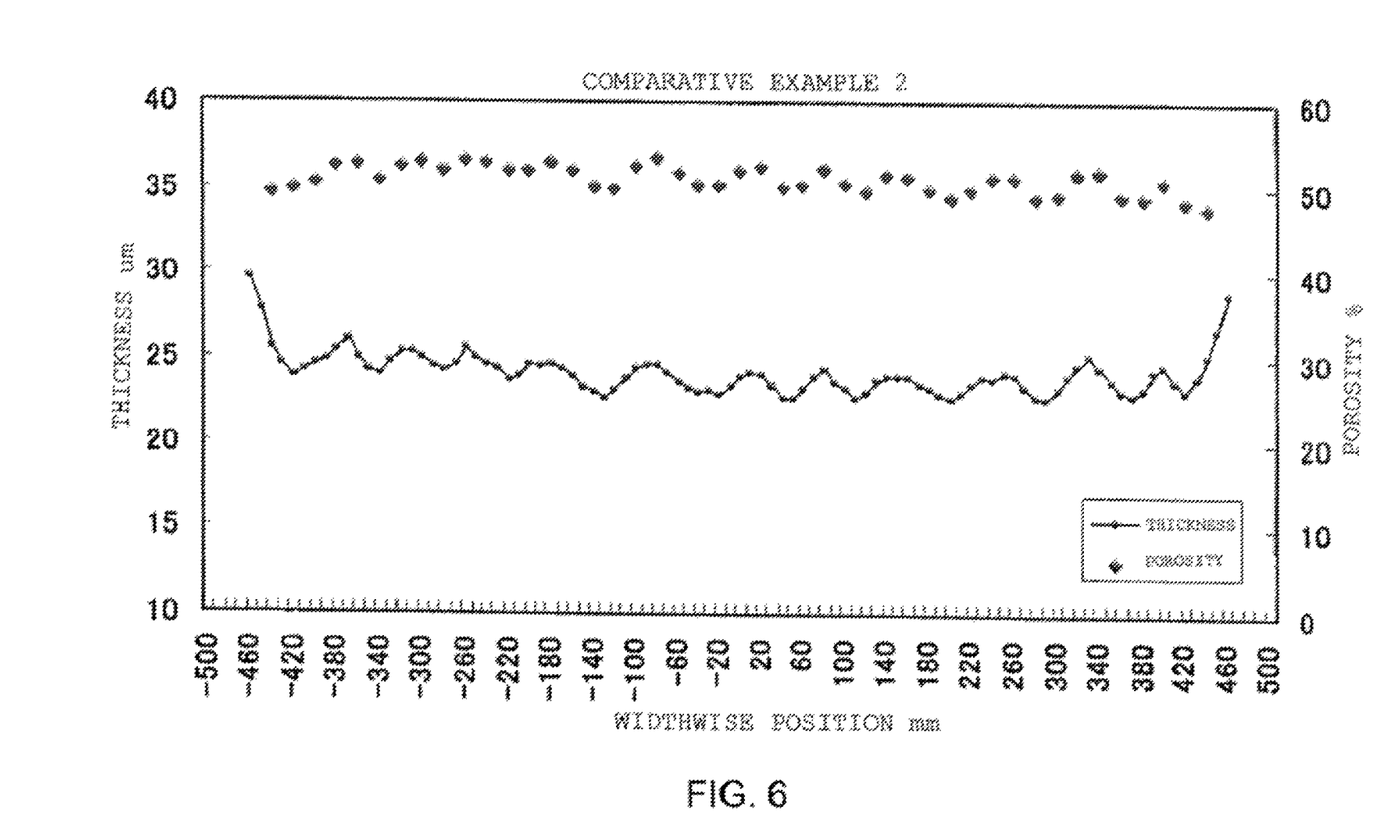
FIG. 6 is a graph of the distribution of thickness and porosity of the microporous film obtained in Comparative Example 2 of the present invention.
Figure 7:
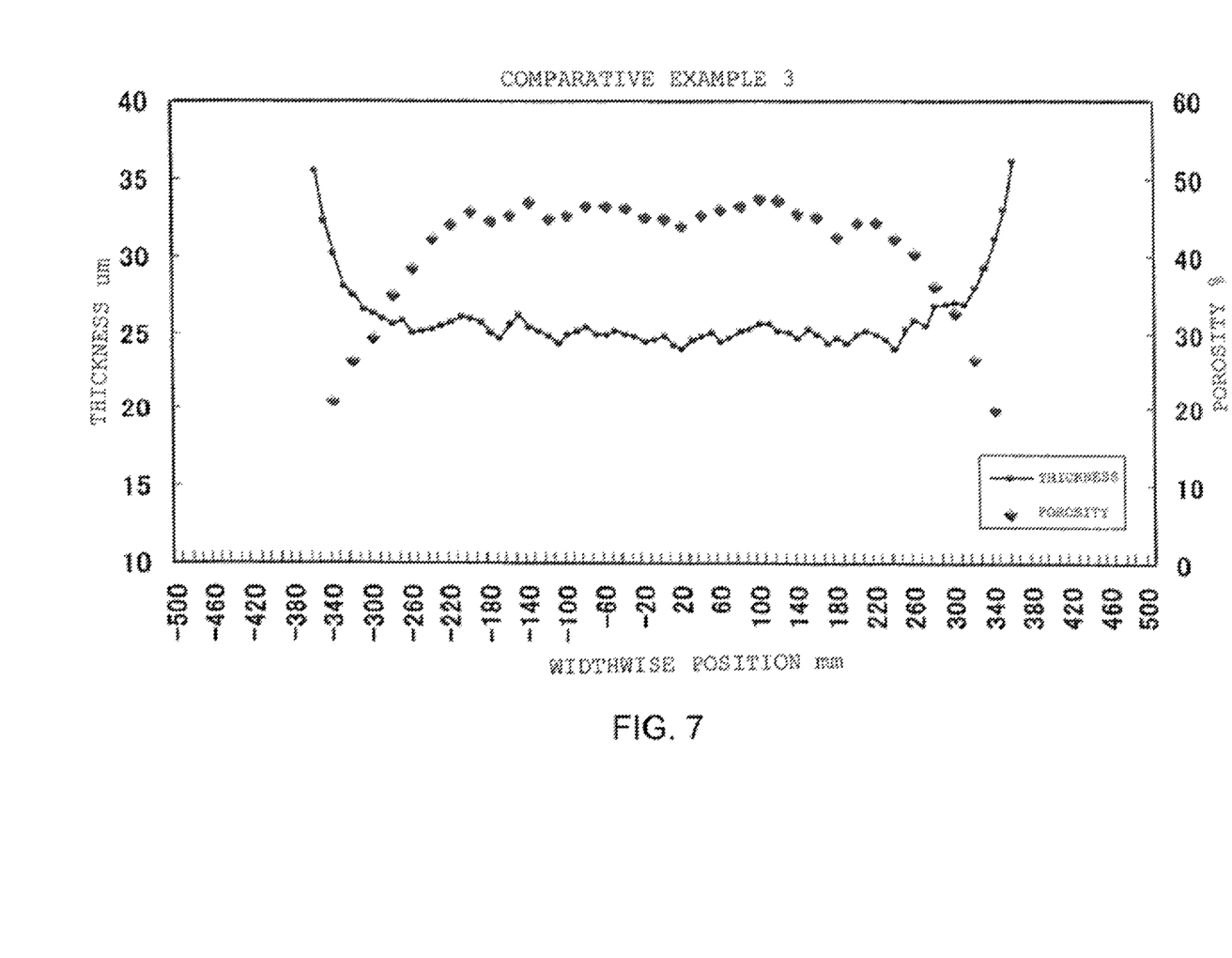
FIG. 7 is a graph of the distribution of thickness and porosity of the microporous film obtained in Comparative Example 3 of the present invention.

Other than using a film-production speed of 20 m/min, [Comparative Example 2 was made] in the same manner as Comparative Example 1. The widthwise distribution of the thickness and porosity of the microporous film thus obtained are shown in Table 1 and FIG. 6.

Comparative Example 3

Other than using a film-production speed of 20 m/min and not using the tenter 13 to mechanically restrain [the film] in the widthwise direction, [Comparative Example 3 was made] in the same manner as Example 2. The widthwise distribution of the thickness and porosity of the microporous film thus obtained are shown in Table 1 and FIG. 6.

TABLE 1

|  | Width mm | Thickness um | | Porosity % | |
|---|---|---|---|---|---|
|  |  | Average | Deviation | Average | Deviation |
| Example 1 | 943 | 24.9 | 0.9 | 53.9 | 1.42 |
| Example 2 | 978 | 24.9 | 0.6 | 54.4 | 0.88 |
| Comparative Example 1 | 942 | 24.9 | 1.0 | 53.8 | 1.71 |
| Comparative Example 2 | 931 | 24.0 | 3.5 | 51.1 | 4.86 |
| Comparative Example 3 | 722 | 25.6 | 7.2 | 42.3 | 21.06 |

Thickness and porosity calculated without including 40 mm on both edge parts.

As can be clearly seen from Examples 1 and 2, a microporous film having uniform thickness and porosity can be obtained in the method of the present invention even when the film-production speed is 70 m/min or 120 m/min. In contrast, in a case where hot air was blown on a heating roll and drying was performed, a microporous film having a uniform thickness and porosity was obtained if the film-production speed was low at 10 m/min (Comparative Example 1), but at a film-production speed of 20 m/min, the variation in the thickness and porosity became severe, and the uniformity of quality and the stability were significantly negatively impacted (Comparative Example 2). Even in the method for immersing in hot water, in cases where there was no mechanical restraint in the widthwise direction, the contraction in the widthwise direction was great, and variation in thickness and porosity became severe.

INDUSTRIAL APPLICABILITY

The method can be used in the high-speed production of a polyolefin microporous film used as filter membranes, separators in various types of cells and capacitors, and the like.

DESCRIPTION OF THE NUMERICAL SYMBOLS

The following is a list of reference numerals and associated parts as used in this specification and drawings:
1: Microporous film
2: Position at which film is brought into close contact with cooling roll
3: Cooling roll (controlled to approximately 35° C.)
4: Nozzles (hot water at approximately 65° C.)
5: Pump
6: Heater
11: Microporous film
12: Water
13: Tenter device
14: Hot water (approximately 60° C.)
15: Water (approximately 25° C.)
16: Heat-insulating material
17: Heater
18: Cooler
19: Pumps The scope of the claims should not be limited by the preferred embodiments and examples, but should be given the broadest interpretation consistent with the specification as a whole.

The invention claimed is:

1. A method for manufacturing a polyolefin microporous film, comprising:
    (a) a step for melt-kneading a composition containing at least a polyolefin resin and a plasticizer, extruding the kneaded composition from a die, and molding a resulting extrudate into a film form;
    (b) a step for stretching the obtained film in at least one direction after the extruding and molding;
    (c) a step for extraction by using a solvent to extract and thereby remove the plasticizer from the film after the stretching; and
    (d) a step for drying the film after the step for extraction, the method for manufacturing the polyolefin microporous film being characterized in that:
    after the step for extraction and before the step for drying, the film is brought into close contact with a roll that is set to a temperature lower than a boiling point of the solvent; and
    a liquid lacking an affinity for polyolefin and being of a temperature equal to or greater than the boiling point of the solvent is brought into contact with the film while the film remains in close contact with the roll, whereby the film is heated and dried.

2. The method for manufacturing a microporous polyolefin film according to claim 1, wherein the liquid lacking affinity for polyolefin is water.

3. The method for manufacturing a microporous polyolefin film according to claim 1, wherein: in the drying step of (d), the liquid lacking an affinity for polyolefin and having a temperature equal to or greater than the boiling point of the solvent is brought into contact with the film from a side of the film opposite a conveying roll, whereby the film is heated.

4. A method for manufacturing a polyolefin microporous film, comprising:
    (a) a step for melt-kneading a composition containing at least a polyolefin resin and a plasticizer, extruding the kneaded composition from a die, and molding a resulting extrudate into a film form;
    (b) a step for stretching the obtained film in at least one direction after the extruding and molding;
    (c) a step for extraction by using a solvent to extract and thereby remove the plasticizer from the film after the stretching; and
    (d) a step for drying the film after the step for extraction, the method for manufacturing the polyolefin microporous film being characterized in that:
    after the step for extraction and before the step for drying, a width of the film is mechanically restrained; and
    a liquid lacking an affinity for polyolefin and being of a temperature equal to or greater than a boiling point of the solvent is brought into contact with the film while the mechanical restraint of the width of the film is maintained, whereby the film is heated and dried, wherein the liquid lacking affinity for polyolefin is water.

5. A method for manufacturing a polyolefin microporous film, comprising:
    (a) a step for melt-kneading a composition containing at least a polyolefin resin and a plasticizer, extruding the kneaded composition from a die, and molding a resulting extrudate into a film form;
    (b) a step for stretching the obtained film in at least one direction after the extruding and molding;

(c) a step for extraction by using a solvent to extract and thereby remove the plasticizer from the film after the stretching; and (d) a step for drying the film after the step for extraction, the method for manufacturing the polyolefin microporous film being characterized in that:

after the step for extraction and before the step for drying, a width of the film is mechanically restrained; and a liquid lacking an affinity for polyolefin and being of a temperature equal to or greater than a boiling point of the solvent is brought into contact with the film while the mechanical restraint of the width of the film is maintained, whereby the film is heated and dried, wherein in the drying step of (d), the liquid lacking an affinity for polyolefin and having a temperature equal to or greater than the boiling point of the solvent is brought into contact with the film from a side of the film opposite a conveying roll, whereby the film is heated.

6. The method for manufacturing a microporous polyolefin film according to claim 2, wherein in the drying step of (d), the liquid lacking an affinity for polyolefin and having a temperature equal to or greater than the boiling point of the solvent is brought into contact with the film from a side of the film opposite a conveying roll, whereby the film is heated.

* * * * *